Patented Aug. 29, 1933

1,924,366

UNITED STATES PATENT OFFICE 1,924,366

REACTOR

Lester O. Marsteller, Pittsburgh, Pa., assignor to Westinghouse Electric & Manufacturing Company, a corporation of Pennsylvania No Drawing. Application March 7, 1931
Serial No. 521,005

2 Claims. (Cl. 175—41.5)

My invention relates to variable reactors and fixed condensers and particularly to means for aligning the capacity of individual condensers mounted on a common shaft, or on several shafts, actuated by a common control or of adjusting fixed condensers.

It is an object of the invention to so align the capacity of individual condensers mounted on a common shaft or actuated by a common control that the capacity of each will be substantially equal to the others at any and all points of setting.

It is another object of the invention to adjust the capacity of fixed condensers without changing the positions of the condenser plates.

It is a further object of the invention to make such correction easily and cheaply.

Other objects and advantages of the invention will become apparent from the following description.

In order to change the capacity of the condensers mounted on a common shaft or actuated by a common control, or of fixed condensers, either the dielectric may be altered by inserting a foreign material between the plates, and/or the spacing between the condenser plates may be changed.

In order to effect the change in the dielectric material between the plates, the plates are painted, or material is otherwise deposited thereon. The material to be used is deposited on one or more plates and has a different value of specific inductive capacity or dielectric constant from that of the material which it supplants.

Any material, the specific inductive capacity of which is of a different value from that of the ordinary air in a variable condenser, may be utilized. For example, mica, sulphur, pyroxolyn, ground glass and many other chemical combinations are among the insulating materials which may be used for this purpose.

A metallic deposit, such as aluminum or bronze powder, may be applied in a non-conducting form to change the effective spacing between the plates.

Some combinations of material, when placed on the plates, will change both the specific-inductive-capacity value and the effective spacing. Some metal powders and lacquer mixed in certain proportions will accomplish this result, but the exact proportions are not known, and no satisfactory explanation of the phenomena can be made at this time.

It is possible to apply the deposit to the entire plate before assembly and to remove material at places thereon to correct the capacity of the plates. Or the material may be so applied, while the units are being adjusted to correct the assembly, so that the capacity of one unit shall match that of another unit.

The same operations may be performed to adjust a fixed condenser to any desired capacity without bending the plates and without any changes in manufacturing for producing fixed condensers having wide ranges of capacity.

It will be readily seen from the foregoing description that I have invented a means for aligning the capacity of individual variable condensers, especially those mounted on a common shaft or actuated by a common control, which alignment may be easily and cheaply accomplished.

Although I have shown and described a specific embodiment of my invention, it is understood that modifications and changes may be made by those skilled in the art without departing from the spirit and scope of the appended claims.

I claim as my invention:

1. The method of correcting irregularities in the capacitance curve of a condenser which method consists in altering the dielectric constant of the dielectric of said condenser only at such points as such irregularities occur.

2. A variable condenser comprising stationary and movable plates, said condenser having material on at least one of said plates irregularly disposed thereon, said material having a dielectric constant differing from that of the contiguous dielectric material.

LESTER O. MARSTELLER.